March 6, 1934.  S. B. SOMERVELL  1,949,551
VEHICLE LIGHT
Filed March 21, 1932
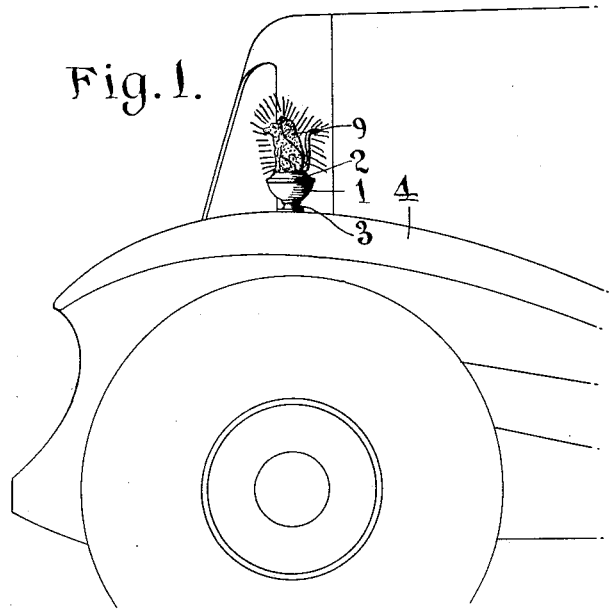
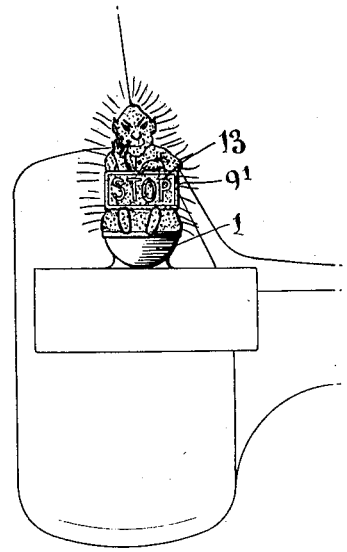
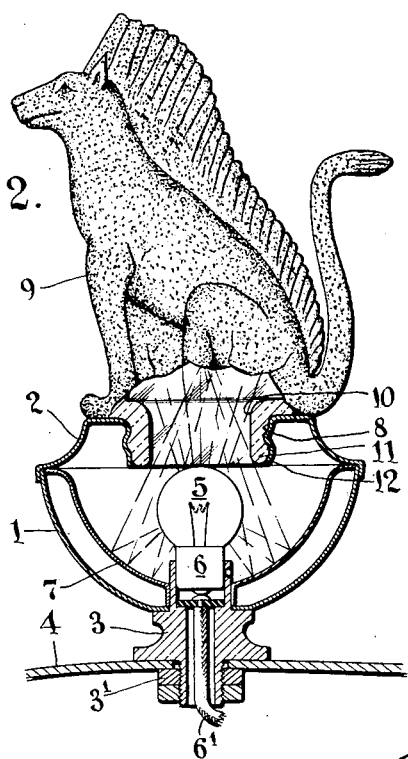
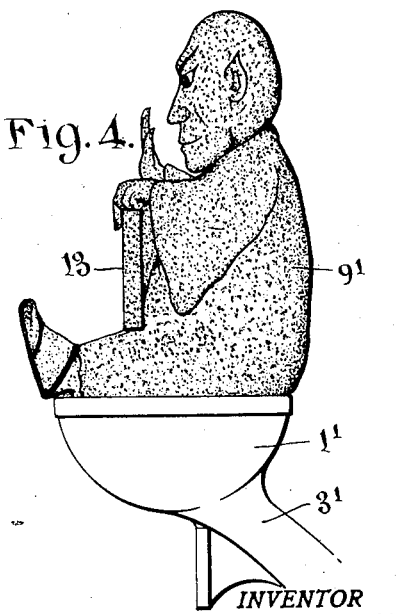
INVENTOR
Somervell B. Somervell,
BY Bean & Brooks, ATTORNEYS Patented Mar. 6, 1934

1,949,551

UNITED STATES PATENT OFFICE 1,949,551

VEHICLE LIGHT

Somervell B. Somervell, Buffalo, N. Y.

Application March 21, 1932, Serial No. 600,230

7 Claims. (Cl. 240—8.22)

This invention relates to a light for motor vehicles and primarily has reference to one of the smaller lights of the vehicle such as the cowl, parking, and stop lights.

As a rule these lights have their sources of light rays disposed so as to shed a small, penetrating light beam. These lights are restricted to a general design as defined by the metal casing or housing with a glass front, and the general ornamentation is therefore obviously restricted. The light beam is directed forwardly or rearwardly but does not give any warning to the side. The light is therefore restricted in its usefulness as well as in adding beauty to the vehicle.

The present invention is to provide an ornamental light which will provide the required degree of illumination with a subdued or soft illumination, and permit wide variations in the ornamental effects, adding to the attractive appearance of the motor vehicle and giving to the same a neat, rich trim.

In the drawing:

Fig. 1 is a fragmentary view of a motor vehicle equipped with a parking light embodying the present invention.

Fig. 2 is an enlarged view of the light, parts being in section to more clearly depict the make-up thereof.

Fig. 3 is a view showing the embodiment of the invention in a stop light.

Fig. 4 is an enlarged view of such stop light.

In proceeding in accordance with the present invention, the light is provided with a hollow metal housing or base 1 open at its top and provided with a closure or cover member 2, these parts being preferably of metal or some other opaque material and provided with a laterally extending bracket (not shown) for mounting on the cowl, or the base may be provided with a pedestal 3 for mounting on the fender 4 of the motor vehicle to serve as a parking light, the base being secured to its support as by fastener 3'. The lamp circuit wire or wires may be passed upwardly through the tubular pedestal, as indicated at 6'.

Concealed within the base 1, or substantially concealed therein, is a source of light 5. This may be a simple incandescent bulb removably mounted in a base socket 6 within an upwardly directed reflector 7, the socket and reflector being supported in the base so that the source of light is preferably disposed centrally in the base, in an upright position.

In the cover member is an opening 8 shown coaxial with the source of light 5 and sufficiently larger in size to permit the ready removal of the bulb as occasion may require.

Surmounting the cover member 2 is a translucent ornamental body 9. This body may be hollow and provided in its bottom with an opening 10 coincident with the opening 8 so that the upwardly directed rays of light will pass into the hollow body and illuminate the same. The body 9 is preferably formed of glass and in order to properly diffuse the light the body is frosted, thereby rendering the same more or less opaque and serving to fully illuminate the ornament with a subdued light effect. The body being substantially illuminated throughout it is visible from whatever point of view the motor vehicle is seen.

By reason of the substantial concealment of the source of light in the opaque base and having the upwardly projected light rays received by the frosted body of the ornament, a soft illuminated trim and appearance is given the vehicle adding richness to the same and enabling ornaments of different designs, from the grotesque to the more artistic, being utilized in the car equipment, according to the dictates of the car manufacturers and owners.

The ornamental body is herein depicted as being detachably mounted on its base such as by providing a tubular stem 11 threaded into the wall or flange 12 which defines the opening 8, the upwardly directed light rays passing through the hollow stem into the body.

In Figs. 3 and 4 the invention is shown embodied in a stop light wherein the ornamental body 9' is mounted upon the base 1', the latter being provided with a mounting bracket 3'. In this particular illustration the ornamental body is provided with a panel 13 across which appears the word "stop". To accentuate or emphasize the word, when illuminated, the letters may be formed of transparent material, or otherwise designed to set forth the signal.

It is therefore obvious from the foregoing that a cowl, parking, or stop light constructed in accordance with the present invention will not only function in the intended manner but will further add a trim and appearance to the vehicle which is attractive, pleasing and ornamental. Further, the ornamental body may assume and take the form of various designs. While the light is capable of being observed from different angles it is subdued so as not to be blinding or annoying to the driver, or to the traffic in general.

What is claimed is:

1. A parking light for motor vehicles comprising an opaque base having a pedestal portion formed with a lamp socket at one end and means at the other end for attaching the base on a vehicle, an opaque cover secured on the base and having a relatively small opening defined by an internally threaded wall, a lamp engaged in the socket, a reflector positioned in the base and maintained therein by the cover, and an ornamental hollow translucent body formed with a reduced threaded tubular stem threaded into the opening; whereby light rays from the lamp and reflector may pass through the tubular stem and evenly illuminate the entire body.

2. A parking light for motor vehicles, comprising, a hollow opaque base having a reduced light emitting opening defined by a wall, a lamp socket secured in the base coaxial and opposite to said opening, a lamp engaged in the socket with its filament inwardly of said opening, a reflector in the base coaxially with the lamp for angularly reflecting light rays from the lamp through said opening, and an ornamental hollow glass body formed with a frosted surface and having a reduced tubular stem engaging into said opening, said stem securing said body to said base and admitting direct and reflected rays from said lamp into said body, and said frosted surface diffusing said rays; whereby said body is evenly illuminated with a soft light.

3. A parking light for motor vehicles, comprising, a hollow opaque base having a reduced light emitting opening defined by an internally threaded wall, a lamp socket secured in the base coaxial with and opposite to said opening, a lamp engaged in the socket with its filament inwardly of said opening, said lamp being insertible and removable through said opening, a reflector in the base coaxial with the lamp for angularly reflecting light rays from the lamp through said opening, and an ornamental hollow glass body formed with a frosted surface and having a reduced stem threading into said opening, said stem securing said body to said base and admitting direct and reflected rays from said lamp into said body and said frosted surface diffusing said rays; whereby said body is evenly illuminated with a soft light.

4. A vehicle parking light comprising a mounting base including a light reflecting chamber and a cover member over said chamber, said cover member having a reduced opening defined by a wall for emitting light from said chamber, a source of light within said chamber, and a hollow translucent figure having a light diffusing surface and a mounting stem secured in said opening; whereby light from said source is emitted from said chamber to said stem at said opening in said figure and said diffusing surface softens said emitted light thereby evenly illuminating said body.

5. A vehicle parking light comprising an opaque mounting base including a light reflecting chamber and an opaque cover member overhanging said chamber, said cover member having a reduced central opening defined by an inturned wall for emitting light from said chamber, a source of light within said chamber, a hollow translucent figure having a light diffusing surface and a hollow mounting stem projecting into said light chamber, and means on said stem for securing said body to said base, whereby light from said source is emitted from said chamber through said stem and opening into said figure and said diffusing surface softens said light thereby evenly illuminating said body.

6. A parking light comprising an opaque base including a light chamber and a pedestal portion, said light chamber having an overhanging cover formed with a seat portion and a central reduced light emitting opening defined by a flange extending into said chamber, said pedestal including a lamp socket, a lamp operably mounted in said socket coaxially with and below said opening, a hollow translucent figure having a seat engaging face and a hollow mounting stem coextensive with said seat portion and said flange respectively, means on said stem cooperating with means on said wall for securing said face on said seat, and a reflector in said chamber for angularly reflecting light rays through said opening and stem, said reflected rays supplementing the emitted direct rays from said light chamber; whereby the entire figure is evenly illuminated.

7. An ornamental light comprising a transparent ornamental body having a light diffusing surface and reduced light admitting portion, an opaque base for said body including a light reflecting chamber having a restricted light emitting portion defined by a wall of said base, means for securing said body to said base, and a source of light concealed by said base, said source of light being inwardly of and aligned with said light emitting and admitting portions; whereby light from said chamber passes through said portions and said body and is distributed by said diffusing surface thereby illuminating the entire body with a soft even light.

SOMERVELL B. SOMERVELL.